US006176700B1

(12) United States Patent
Gellert

(10) Patent No.: US 6,176,700 B1
(45) Date of Patent: Jan. 23, 2001

(54) INJECTION MOLDING COOLED CAVITY INSERT

(76) Inventor: Jobst Ulrich Gellert, 7A Prince Street, Georgetown, Ontario (CA), L7G 2X1

( * ) Notice: Under 35 U.S.C. 154(b), the term of this patent shall be extended for 0 days.

(21) Appl. No.: 09/261,467

(22) Filed: Feb. 24, 1999

(30) Foreign Application Priority Data

Feb. 17, 1999 (CA) .................................................. 2262176

(51) Int. Cl.$^7$ ................................................ B29C 45/73
(52) U.S. Cl. .......................... 425/547; 425/548; 425/552
(58) Field of Search ..................................... 425/526, 547, 425/548, 552, 549

(56) References Cited

U.S. PATENT DOCUMENTS

| 4,497,624 | 2/1985 | Brun et al. . |
| 4,622,001 | 11/1986 | Bright et al. . |
| 5,427,519 | 6/1995 | Gellert . |
| 5,443,381 | 8/1995 | Gellert . |
| 5,498,150 | 3/1996 | Check ................................. 425/526 |
| 5,582,851 | 12/1996 | Hofstetter et al. . |
| 5,631,030 | * 5/1997 | Brun, Jr. et al. ..................... 425/526 |
| 5,652,003 | 7/1997 | Gellert . |
| 5,736,173 | 4/1998 | Wright et al. . |

FOREIGN PATENT DOCUMENTS

| 1 938 496 | 2/1971 | (DE) . |
| 92 01 642 | 7/1992 | (DE) . |
| 42 34 961 | 4/1994 | (DE) . |
| 199 03 614 | 8/1999 | (DE) . |

* cited by examiner

Primary Examiner—Tim Heitbrink
(74) Attorney, Agent, or Firm—Foley & Lardner

(57) ABSTRACT

Injection molding apparatus having a cavity insert (10) with integral inner and outer portions (136, 138) having a cooling fluid flow channel (166) extending therebetween. In a preferred embodiment, the cooling fluid flow channel (166) is formed by a groove (164) machined in the outer surface (162) of the inner portion (136). This brings the cooling fluid flow closer to the cavity (66) and improves cooling efficiency and reduces cycle time.

8 Claims, 3 Drawing Sheets

INJECTION MOLDING COOLED CAVITY INSERT

BACKGROUND OF THE INVENTION

This application relates generally to injection molding apparatus and more particularly to injection molding apparatus having a cavity insert with a cooling fluid flow channel therein.

Injection molding apparatus having cooling fluid channels or conduits are well known. For instance, the applicant's U.S. Pat. No. 5,427,519 which issued Jun. 27, 1995 shows a thermal setting application wherein a cooling fluid channel extends around a central liquid molding material channel in a nozzle. The applicant's U.S. Pat. No. 5,443,381 which issued Aug. 22, 1995 shows hot runner apparatus having cooling fluid conduits extending through a gate insert. Canadian Patent Application Serial Number 2,228,931 filed Feb. 2, 1998 by Mold-Masters Limited is another example of a gate insert having helical cooling fluid conduits or passages.

SUMMARY OF THE INVENTION

Accordingly, it is an object of the present invention to at least partially overcome the disadvantages of the prior art by providing a cavity insert with inner and outer portions integrally joined together with a cooling fluid flow channel extending between the inner and outer portions.

To this end, in one of its aspects, the invention provides injection molding apparatus having a cavity with an outer surface extending in a mold and a hollow cavity insert having an inner surface mounted in the mold, wherein the inner surface of the cavity insert forms the outer surface of the cavity. The cavity insert has a hollow inner portion and a hollow outer portion integrally joined together. The outer portion has an inner surface and the inner portion has an outer surface. The inner portion fits inside the outer portion with the outer surface of the inner portion adjacent the inner surface of the outer portion. Either the outer surface of the inner portion or the inner surface of the outer portion has a groove therein to form a cooling fluid flow channel extending between the inner portion and the outer portion. The cooling fluid flow channel extends from a cooling fluid inlet to a cooling fluid outlet in a predetermined configuration around the cavity.

Further objects and advantages of the invention will appear from the following description taken together with the accompanying drawings.

DETAILED DESCRIPTION OF THE INVENTION

Figure 1:
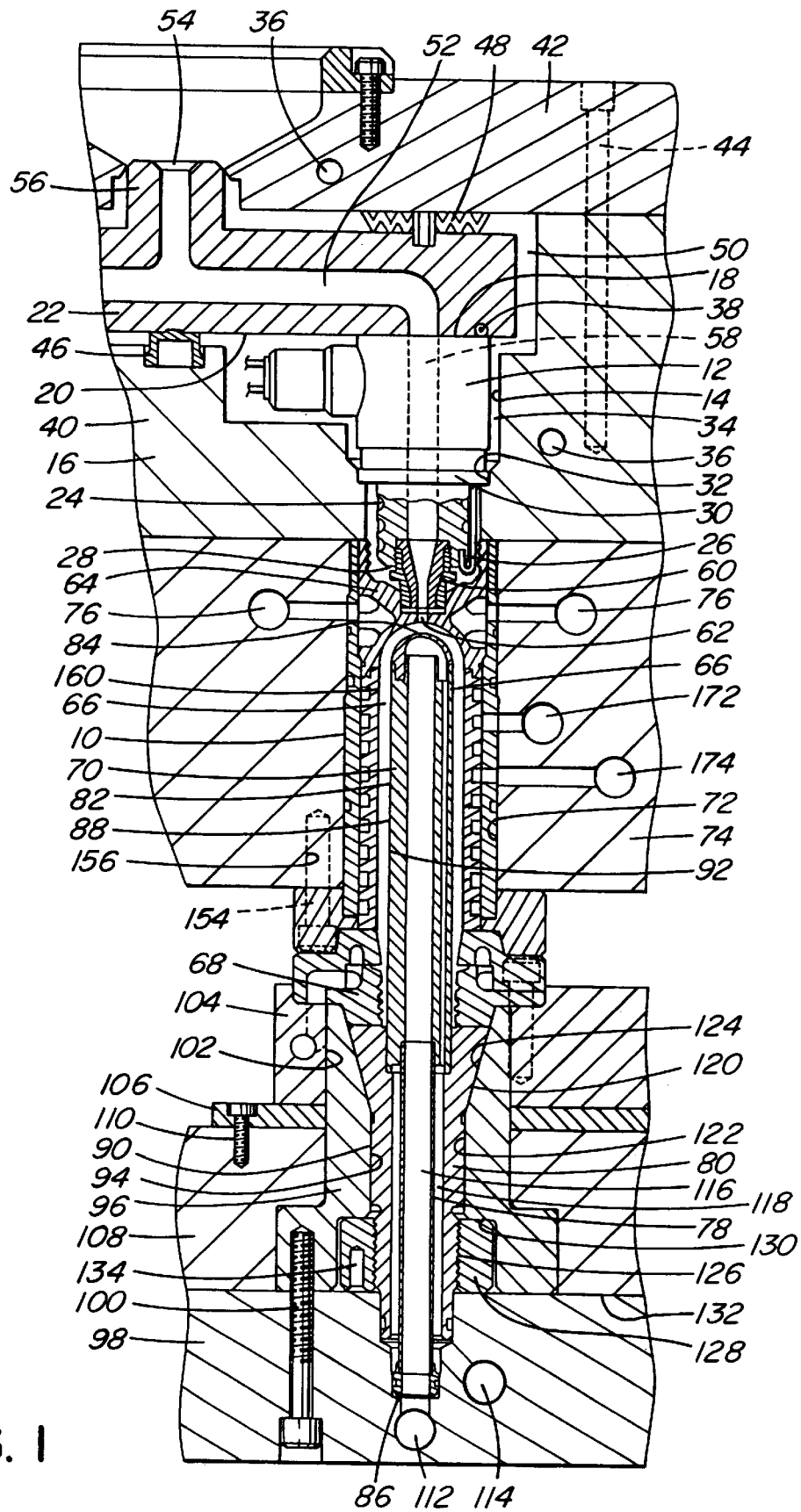
FIG. 1 is a sectional view of a portion of a multi-cavity injection molding system showing a cavity insert according to a preferred embodiment of the invention.

Reference is first made to FIG. 1 which shows a portion of a multi-cavity injection molding system or apparatus used for molding beverage bottle preforms having an elongated fluid cooled hollow cavity insert 10 according to a preferred embodiment of the invention. In this configuration, a number of heated nozzles 12 are mounted in openings 14 in a mold 16 with the rear end 18 of each heated nozzle 12 abutting against the front face 20 of a steel melt distribution manifold 22. Each nozzle 12 is heated by an integral electrical heating element 24 and has a thermocouple element 26 extending into its front end 28 to monitor and control the operating temperature. Each heated nozzle 12 has a cylindrical locating flange 30 seated in a circular locating seat 32 in the opening 14. This provides an insulative air space 34 between the heated nozzle 12 and the surrounding mold 16, which is cooled by pumping cooling water through cooling conduits 36.

The melt distribution manifold 22 is also heated by an integral electrical heating element 38. The melt distribution manifold 22 is mounted between a manifold plate 40 and clamp plate 42 which are secured together by bolts 44. The melt distribution manifold 22 is located by a central locating ring 46 and a number of insulative spacers 48 which provide an insulative air space 50 between it and the surrounding cooled mold 16.

A melt passage 52 extends from a central inlet 54 in an inlet portion 56 of the melt distribution manifold 22 and branches in the melt distribution manifold 22 to extend through a central melt bore 58 in each of the heated nozzles 12. The melt passage 52 extends through a two-piece nozzle seal 60 aligned with a gate 62 extending through a cooled gate insert 64 to an elongated cavity 66. This cavity 66 for making beverage bottle preforms extends between the cavity insert 10 and thread split inserts 68 on the outside and a cooled mold core 70 on the inside. The gate insert 64 and the cavity insert 10 are seated in an opening 72 in a cavity plate 74 through which cooling water lines 76 extend to the cooled gate insert 64.

The cooled mold core 70 has an elongated hollow inner part 78 extending inside an elongated hollow outer part 80. The mold core 70 has an outer surface 82 extending from a dome shaped front end 84 to a rear end 86. The outer surface 82 of the elongated mold core 70 has a front portion 88 and a rear portion 90. The front portion 88 forms the inner surface 92 of the cavity 66, and the rear portion 90 extends rearwardly from the cavity 66 through an opening 94 through a core lock member 96 which is secured to a core backing plate 98 by bolts 100. The core lock member 96 in turn extends through an opening 102 through a slide member 104 and a wear plate 106 which is secured to a stripper plate 108 by screws 110. Cooling fluid supply and return lines 112, 114 extend in the core backing plate 98 and are connected respectively to a central cooling fluid duct 116 extending longitudinally through the inner part 78 and a cylindrical outer cooling fluid duct 118 extending between the inner part 78 and the outer part 80 of the mold core 70.

The rear portion 90 of the outer surface 82 of the mold core 70 has a tapered part 120 which tapers inwardly towards the rear end 86 of the mold core 70. As can be seen, the opening 94 through the core lock member 96 has an inner surface 122 with a tapered part 124 which also tapers inwardly towards the rear end 86 of the mold core 70 and matches the tapered part 120 of the rear portion 90 of the outer surface 82 of the mold core 70. The rear portion 90 of the outer surface 82 of the mold core 70 also has a threaded part 126 onto which a cylindrical nut 128 is screwed. The nut 128 is seated in a seat 130 in the rear face 132 of the core lock-member 96 and is tightened by a spanner wrench which fits in holes 134 to secure the mold core 70 to the core lock member 96 with the tapered part 120 of the outer surface 82 of the mold core 70 abutting against the matching tapered part 124 of the inner surface 122 of the opening 94 through the core lock member 96.

Figure 2:
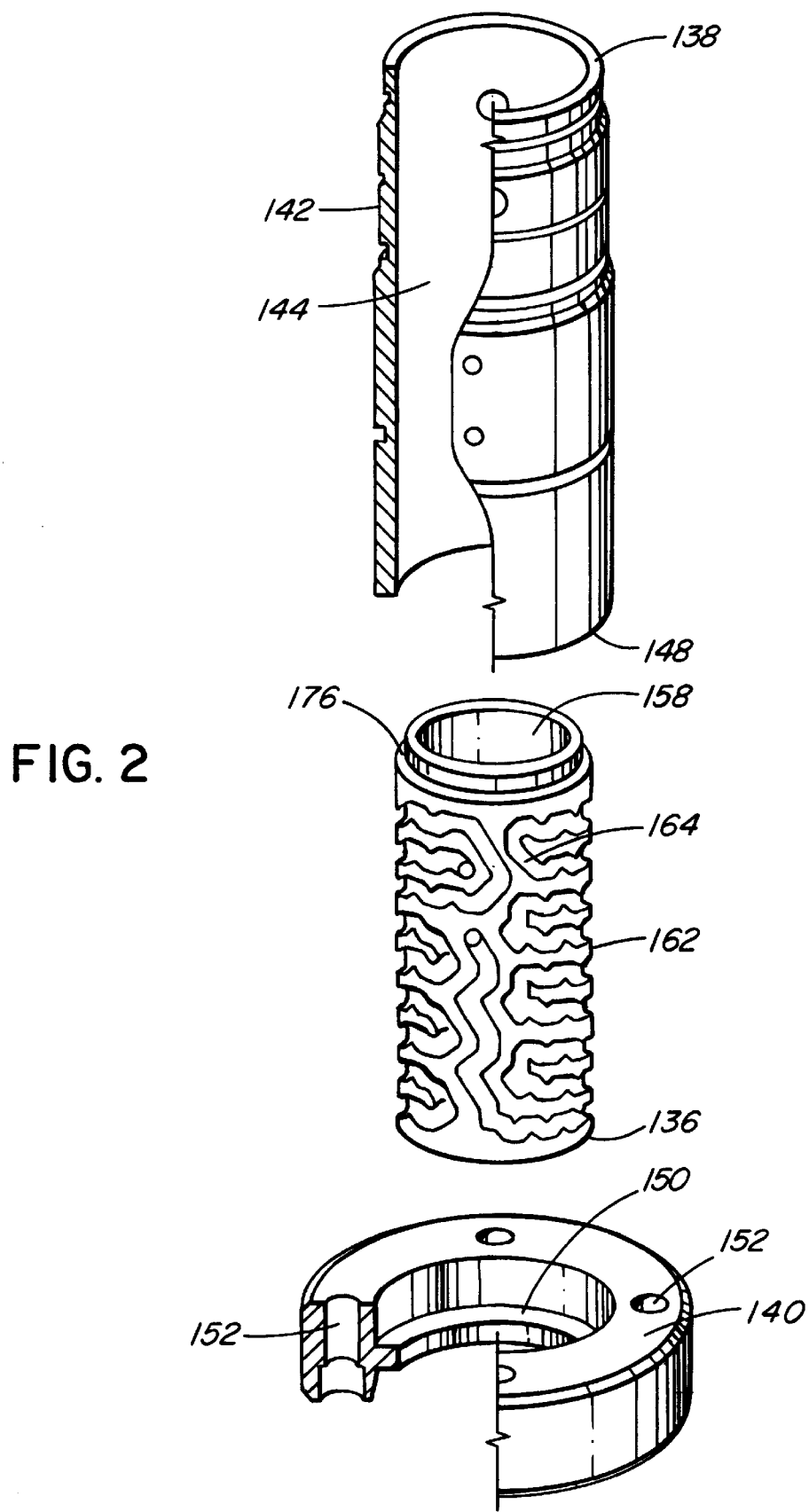
FIG. 2 is an exploded isometric view showing the three portions of the cavity insert seen in FIG. 1 in position for assembly.
Figure 3:
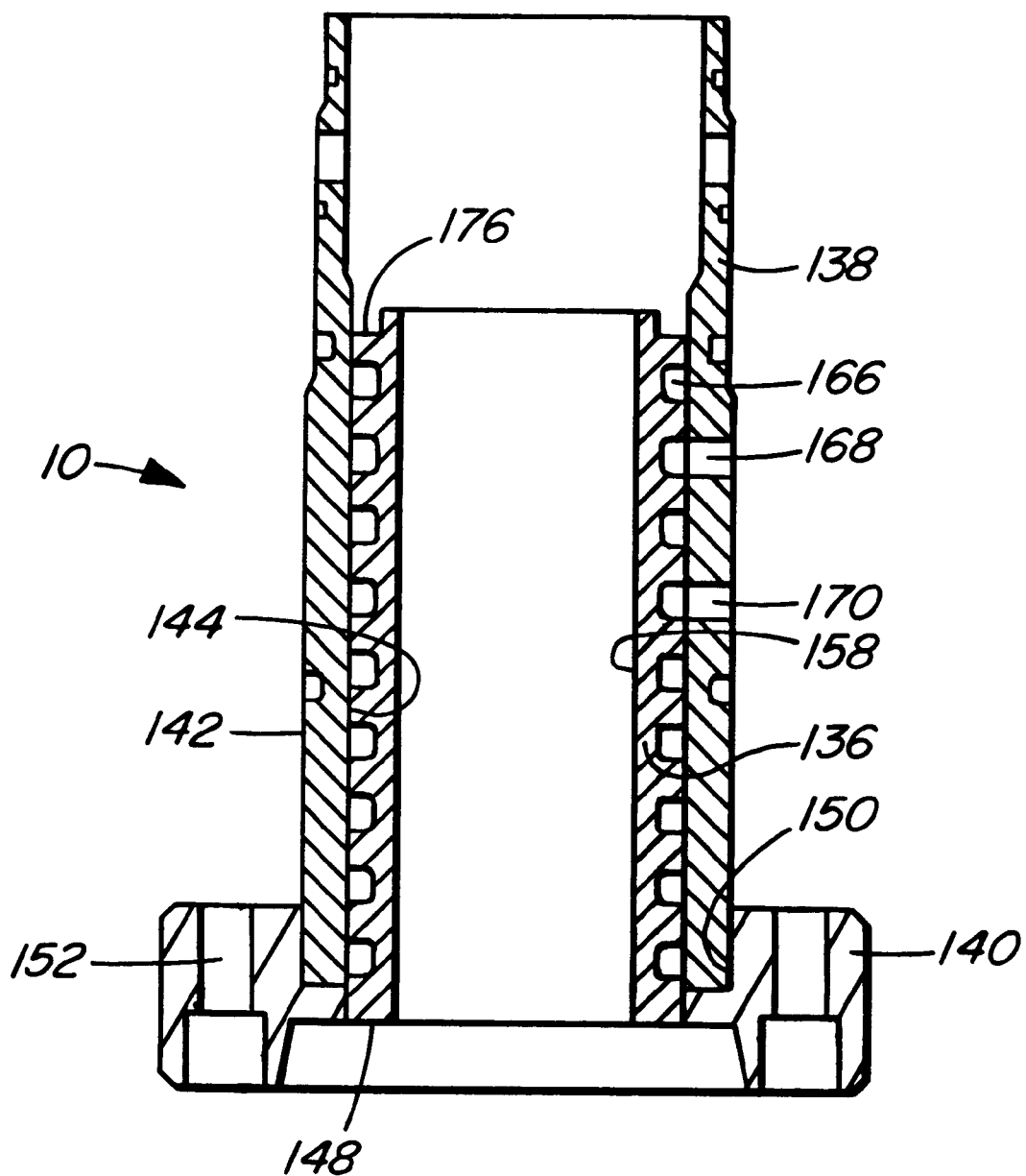
FIG. 3 is a sectional view of the cavity insert seen in FIG. 2 with the three portions integrally joined together.

Also referring to FIGS. 2 and 3, the cavity insert 10 has an elongated hollow inner portion 136, an elongated hollow outer portion 138, and a base portion 140. The outer portion 138 has an outer surface 142 and a cylindrical inner surface 144. As can be seen, the outer surface 142 tapers inwardly towards the front and fits in the matching tapered opening 72 extending through the cavity plate 74. The outer portion 138 also has a rear end 148 which fits in a circular seat 150 in the base portion 140. The base portion 140 has holes 152 through which screws 154 extend into holes 156 in the cavity plate 74 to secure the cavity insert 10 in place.

In this embodiment, the inner portion 136 of the cavity insert 10 has a cylindrical inner surface 158 which forms the outer surface 160 of the cavity 66 and an outer surface 162 with a groove 164 therein which fits inside the outer portion 138, with the outer surface 162 of the inner portion 136 adjacent the inner surface 144 of the outer portion 138. The groove 164 in the outer surface 162 of the inner portion 136 extends in a predetermined configuration to form a cooling fluid flow channel 166 extending between the inner portion 136 and the outer portion 138 from a cooling fluid inlet 168 and a cooling fluid outlet 170, both of which extend through the outer portion 138 to supply and return lines 172, 174 respectively in the cavity plate 74. In this embodiment, the outer portion 138 of the cavity insert 10 is longer than the inner portion 136 to also receive the gate insert 64 therein.

Reference is now made to FIGS. 2 and 3 in describing the method of making the cavity insert 10 according to the invention. First, the inner portion 136, the outer portion 138 and the base portion 140 seen in FIG. 2 are machined of steel with the groove 164 shaped to provide turbulent flow extending in the outer surface 162 of the inner portion 136. Then, a bead of nickel alloy brazing paste is applied around the circular seat 150 in the base portion 140, and the inner portion 136, the outer portion 138 and the base portion are assembled as seen in FIG. 3. Another bead of nickel alloy brazing paste is applied around the front end 176 of the inner portion 136. The assembled inner portion 136, outer portion 138 and base portion 140 are then gradually heated in a vacuum furnace to a temperature of approximately 1925° F. which is above the melting point of the nickel alloy. As the furnace is heated, it is evacuated to a relatively high vacuum to remove substantially all of the oxygen and then partially backfilled with an inert gas such as argon or nitrogen. When the melt point of the nickel alloy is reached, it melts and flows by capillary action between the inner and outer portions 136, 138 and the base portion 140 to integrally braze the three portions together to form the integral one-piece cavity insert 10 shown in FIG. 3. Brazing them together this way in the vacuum furnace provides a metallurgical bonding between them to maximize the strength of the cavity insert 10 and prevent leakage of the cooling fluid from the cooling fluid flow channel 166.

In use, after the system has been assembled as shown in FIG. 1, electrical power is applied to the heating elements 24, 38 to heat the nozzles 12 and the melt distribution manifold 22 to a predetermined operating temperature. A suitable cooling fluid such as water is also circulated by pumps (not shown) through the cooling conduits 36 in the mold 16 and the lines 76 in the cavity plate 74 leading to the gate inserts 64. Usually a cleaner cooling fluid such as glycol is pumped in closed loop cooling systems through the supply and return lines 112, 114 to circulate through the mold cores 70 and through the supply and return line 172, 174 to circulate through the cavity inserts 10. Pressurized melt from a molding machine (not shown) is then introduced according to a predetermined injection cycle into the central inlet 54 of the melt passage 52 of the melt distribution manifold 22, from where it flows through the central melt bore 58 in each of the heated nozzles 12 and the two-piece nozzle seals 60 and through the gates 62 to fill the cavities 66. After the cavities 66 are full, injection pressure is held momentarily to pack and then released. After a short cooling period, the mold 16 is opened to eject the product. After ejection, the mold 16 is closed and the injection pressure is reapplied to refill the cavity 66. This cycle is repeated continuously with a cycle time dependent upon the size of the cavities 66 and the type of material being molded.

While the description of the cooled cavity insert 10 having a cooling fluid flow channel 166 extending between integral inner and outer portions 136, 138 has been given with respect to a preferred embodiment, it will be evident that various other modifications are possible without departing from the scope of the invention as understood by those skilled in the art and as provided in the following claims.

The embodiments of the invention in which an exclusive property or privilege is claimed is defined as follows:

1. In an injection molding apparatus having a cavity (66) with an outer surface (160) extending in a mold (16) and a hollow cavity insert (10) having an inner surface (158) mounted in the mold (16) wherein the inner surface (158) of the cavity insert (10) forms at least a portion of the outer surface (160) of the cavity (66), the improvement wherein;

the cavity insert (10) has at least a hollow inner portion (136) and a separately formed hollow outer portion (138) integrally joined to the inner portion, the outer portion (138) having an inner surface (144) and the inner portion (136) having an outer surface (162), the inner portion (136) fitting inside the outer portion (138) with the outer surface (162) of the inner portion (136) adjacent the inner surface (144) of the outer portion (138), one of the outer surface (162) of the inner portion (136) and the inner surface (144) of the outer portion (138) having a groove (164) therein to form a cooling fluid flow channel (166) extending between the inner portion (136) and the outer portion (138) from a cooling fluid inlet (168) to a cooling fluid outlet (170) in a predetermined configuration around the cavity (66).

2. Injection molding apparatus as claimed in claim 1 wherein the other of the outer surface (162) of the inner portion (136) and the inner surface (144) of the outer portion (138) of the cavity insert (10) is generally cylindrical.

3. Injection molding apparatus as claimed in claim 2 wherein the groove (164) extends in the outer surface (162) of the inner portion (136) of the cavity insert (10).

4. Injection molding apparatus as claimed in claim 3 wherein the cavity insert (10) is elongated and extends around an elongated central mold core (70) having an outer surface (82), the cavity (66) is elongated, has an inner surface (92), and extends between the elongated central mold core (70) and the elongated cavity insert (10), with the outer surface (82) of the central mold core (70) forming at least a portion of the inner surface (92) of the elongated cavity (66).

5. An injection molding apparatus as claimed in claim 1 where the cooling channel (166) creates a turbulent flow.

6. An injection molding apparatus as claimed in claim 1 wherein the cooling channel (166) has one inlet (172) and one outlet (174) located on the same side of the mold cooling insert (10).

7. An injection molding apparatus comprising a mold core (70) and a substantially cylindrical mold cavity insert located in a mold cavity plate (74), said mold cavity insert (10) being made of at least an inner portion (136) and a separately formed outer portion (138) metallurgically bonded together to form a mold cavity cooling channel (166) therebetween.

8. An injection molding apparatus comprising a mold core (70), a mold cavity plate (74), a substantially cylindrical mold cavity insert (10) located in said mold cavity plate (74), said mold cavity insert (10) being made of at least an inner portion (136) and a separately formed outer portion (138) metallurgically bonded together to form a mold cavity cooling channel (166) therebetween and a gate insert (64), whereby the outer portion (138) of the mold cavity insert (10) extends beyond the inner portion (136) of the mold cavity insert (10) and around the gate insert (64).

\* \* \* \* \*